United States Patent

[11] 3,583,833

| [72] | Inventor | Melvin F. Huber<br>Grafton, Ohio |
|---|---|---|
| [21] | Appl. No. | 842,293 |
| [22] | Filed | July 16, 1969 |
| [45] | Patented | June 8, 1971 |
| [73] | Assignee | Lear Siegler, Inc.<br>Maple Heights, Ohio |

[54] MOTOR DRIVEN PUMP
14 Claims, 2 Drawing Figs.

[52] U.S. Cl. .................................................. 417/360,
417/424
[51] Int. Cl. ....................................................... F04d 13/02
[50] Field of Search......................................... 103/87, 87
D, 87 E, 118, 113 P; 230/117, 117 A; 417/360,
410, 423, 424

[56] References Cited
UNITED STATES PATENTS

| 2,362,954 | 11/1944 | Adams .......................... | 103/113X |
| 2,368,529 | 1/1945 | Edwards....................... | 103/113 |
| 2,649,048 | 8/1953 | Pezzillo et al................. | 103/87 |
| 2,895,666 | 7/1959 | Girdwood et al. ............ | 230/117 |

*Primary Examiner*—Robert M. Walker
*Attorney*—Oberline, Maky, Donnelly & Renner ABSTRACT: A motor driven pump in which the pump and motor are fastened together utilizing a single hollow fastener that also acts as a bearing for the rotor shaft and pump impeller and provides an exit for the electrical leads for the motor.

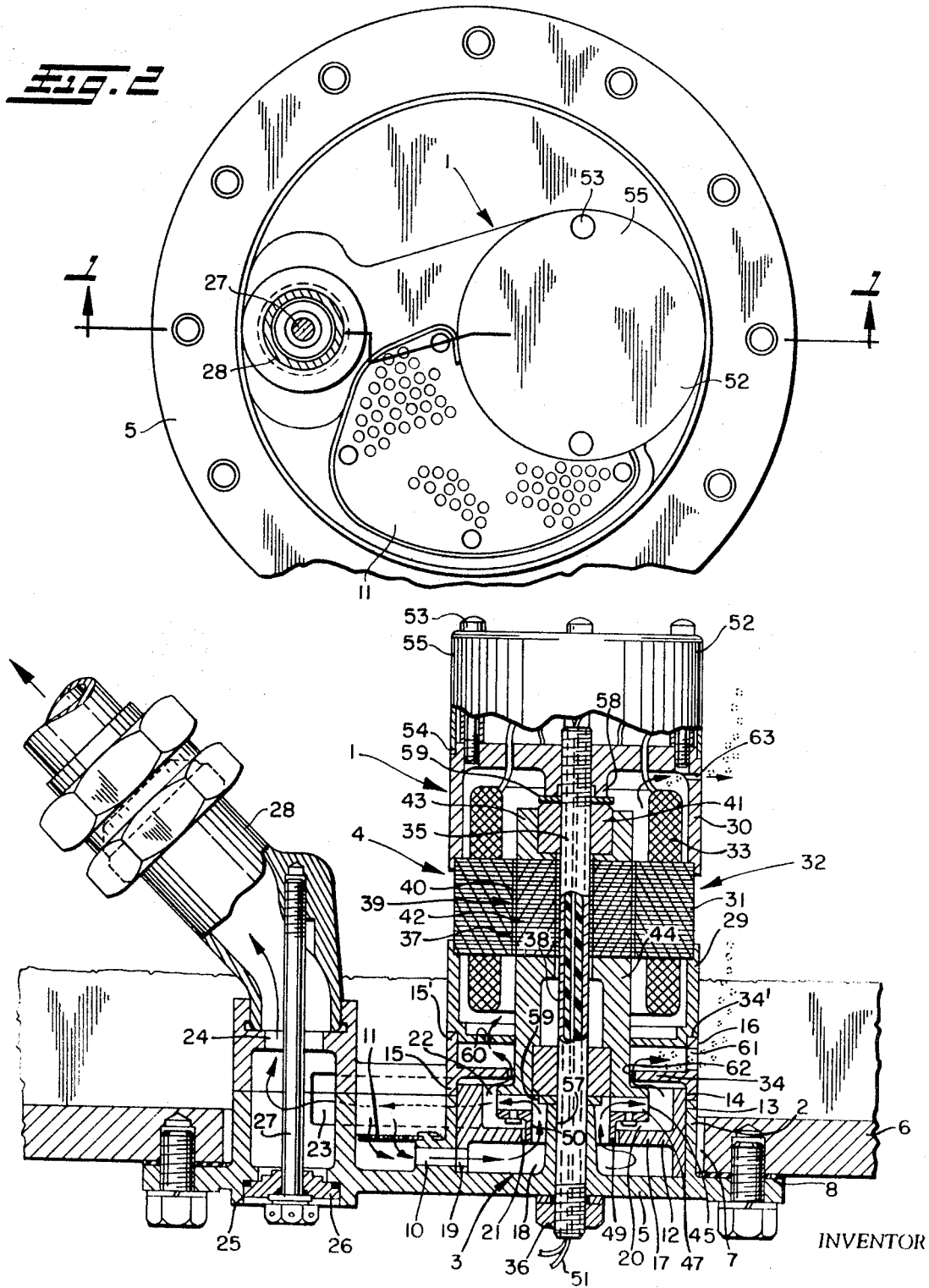

MOTOR DRIVEN PUMP

BACKGROUND OF THE INVENTION

This invention generally relates to a motor driven pump of relatively simple construction having relatively few parts which are readily assembled into a lightweight, compact package and is highly reliable.

Most pump and motor combinations comprise separate pump and motor units each including their own respective bearing mounted shafts which are mechanically coupled together for driving of the pump by the motor. This makes the assembly relatively complex and costly and also adds to the weight and size thereof. Moreover, the pump and motor housings are usually bolted together using a plurality of fasteners, which increases the assembly time, and special sealed connectors are also required for the lead exits of wet motor and pump designs, which further adds to the cost and complexity of the assembly, whereby the assembly may not be suitable for certain applications, particularly aircraft.

Some progress has previously been made in reducing these drawbacks by mounting the pump impeller directly on an extension of the rotor shaft, but separate mounting bolts and special sealed connectors are still required for certain applications, and there are instances in which it is desirable to have a pump and motor combination which is more compact and lighter than those now available.

SUMMARY OF THE INVENTION

It is accordingly a principal object of this invention to provide a pump and motor combination of low cost construction which has very few parts and is quite compact.

Another object is to provide a motor driven pump which may readily be assembled using a single fastener.

Still another object is to provide such a motor driven pump which may be submerged in the liquid to be pumped without the need for special sealed connectors for the electrical lead exit.

These and other objects of the present invention may be achieved by providing a motor and pump construction in which the pump and motor are fastened together utilizing a single fastener that also acts as a bearing for the rotor shaft and impeller. The impeller may be connected directly to the rotor to provide a construction in which there is only one rotating part, and the fastener may be made hollow and filled with a sealant to provide an exit for the electrical leads. The resulting pump and motor combination is very simple in construction, highly reliable, of relatively low cost, and lightweight.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

BRIEF DESCRIPTION OF THE DRAWINGS

In the annexed drawings:

Fig. 1 is a fragmentary longitudinal section through a preferred form of motor and pump assembly constructed in accordance with this invention, taken on the plane of the line 1-1 of FIG. 2, shown bolted to the bottom of a tank; and FIG. 2 is a partial top plan view of the motor and pump assembly of FIG. 1.

DESCRIPTION OF THE PREFERRED EMBODIMENT

Referring now more particularly to the drawings, a preferred form of motor driven pump in accordance with this invention is generally indicated by the reference numeral 1 and comprises a centrifugal pump 3 and motor 4 which are fastened together in a manner to subsequently fully explained. The pump 3 includes an annular housing 2 having an end wall 5 at the lower end which extends radially outwardly beyond the pump housing to provide a mounting surface for attachment of the motor driven pump 1 to the bottom of a fuel tank 6 or other surface with the pump 3 and motor 4 projecting into the tank through an opening 7 as shown. A suitable gasket 8 may also be disposed between such tank bottom and outer base portion to preclude leakage of fluid from the tank.

Extending through the annular housing 2 adjacent the end wall 5 there is a radial inlet port 10 for permitting passage of fuel or other fluid to be pumped into the housing. A perforated inlet screen 11 may be placed over the inlet port 10 and secured in place to filter out any contaminants which might be contained in the fluid before entering the inlet port.

Disposed within the annular housing 2 is an insert 12 having a generally cylindrical outer surface 13 which is closely slidably received therein and projects axially outwardly therebeyond a slight distance, sufficient to provide a pilot surface 14 for accurately locating the downwardly extending flange portion 15 of a vapor housing 16 which may have openings or windows therein to permit escape of vapors from the pump housing, in a manner to be subsequently described.

Intermediate the ends of the insert 12 there is a transverse web 17 which divides the space enclosed by the end wall 5 of the annular housing 2 and transverse web 34 of the vapor housing 16 into an inlet chamber 18 having fluid communication with the inlet port 10 through an aligned radial opening 19 in the insert 12 and pumping chamber 20 into which fluid is drawn from the inlet chamber 18 by the pump 3 through a central opening 21 in the web 17. From the pumping chamber 20 the fluid is discharged through aligned openings 22 in the upper end of the insert 12 and annular housing 2 from which the fluid passes through a discharge passage 23 for discharge through one or the other of the discharge ports 24, 25. The discharge port 25 not used is closed by a cap 26 as shown, and a bolt 27 extends from the cap 26 through the other discharge port 24 for releasably clamping a tube fitting 28 to the discharge port 24. A hose or the like may be suitably coupled to the tube fitting 28 for conveying the fluid where desired, as for example, to a main fuel pump.

Clamped between the lower and upper end bells 29 and 30 of the electric motor 4 are a stack of laminations 31 which comprise the stator assembly 32. The stator laminations 31 are riveted or welded together and prewound with field windings 33 as shown, and the entire stator assembly 32 may be directly exposed to the fuel within the tank or enclosed in a fluidtight casing as desired. In any event, the motor 4, including the end bells 29 and 30 and stator assembly 32, and the vapor housing 16 are clamped to the pump housing 2 with the use of an elongated fastener 35 in the form of a hollow bolt extending through aligned openings in the end wall 5 of the housing 2, transverse web 17, vapor housing web 34 and end bells 29 and 30. The hollow bolt 35 is screwed into the end bell 30, whereby when the nut 36 at the opposite end of the bolt 35 is tightened it draws the end bells 29 and 30 and vapor housing 16 toward the housing 2 for establishing firm seating engagement between the upwardly extending flange portion 15 of vapor housing 16 and lower end bell 29, and also between the downwardly extending flange portion 15 of vapor housing 16 and upper end of housing 2. A shoulder 34' may be provided on the lower end bell 29 for engagement by the upwardly projecting flange portion 15' on the vapor housing 16 to locate the motor with respect to the pump housing 2, and suitable packings may also be provided around the fastener 35 adjacent the opening in the end wall 5 to preclude leakage of fluid therepast.

The fastener 35 is in coaxial alignment with the stator bore 37 and has a smooth outer cylindrical surface 38 providing a bearing mount for the rotor assembly 39 which is telescopically received thereon, such rotor assembly 39 having a slight radial clearance 40 with the wall of the stator bore 37 and including a stack of rotor laminations 42 and end rings 43 and 44 at opposite ends of the rotor laminations. Bushings or bearings 41 contained in counterbores in opposite ends of the end rings 43 and 44 journal the rotor assembly 39 for rotation on the fastener 35.

Also mounted on the fastener 35 is the pump impeller 45 which is desirably a part of the rotor assembly 39 as shown, but may be a separate part if desired. The impeller 45 is located within the pumping chamber 20 and has a plurality of blades 47 extending radially outwardly from the end ring 44 at an angle. A closed shroud 49 may be used to enclose the bottom sides of the blades thus to eliminate shimming for impeller clearance and the shroud has a downwardly extending tubular portion 50 which extends into the central opening 21 in the transverse web 17 and provides a path for the flow of fluid from the inlet chamber 18 to the radial inner ends of the blade. The pump impeller 45 may be keyed directly to the rotor assembly 39 if the pump impeller 45 is not an integral extension thereof, whereby excitation of the field windings 33 will cause rotation of the rotor assembly 39 and impeller 45 connected thereto thus to draw fluid from the inlet chamber 18 and force the fluid radially outwardly by the blades for discharge through the discharge port 24.

Making the fastener 35 hollow and sealed provides a convenient exit for the electrical lead wires 51 for supplying power to the field windings 33 thus eliminating the need for the special sealed connectors which are ordinarily used for this purpose. The lead wires 51 may be connected directly to the field windings 33 if a suitable supply of alternating current is available, or if there is a DC source, such lead wires may by connected to an inverter assembly 52 of suitable type, which is in turn connected to the field windings through an opening in the end bell 30 as shown for providing the required alternating current for driving the motor. The inverter assembly 52 may also be retained in place against the upper end bell 30 by suitable fasteners 53. A skirt portion 54 on the inverter housing 55 fits over the outer end of the upper end bell 30 for properly locating the inverter assembly thereon. The axial location of the rotor assembly 39 within the stator assembly 32 and pump impeller 45 within the pumping chamber 20 is accurately controlled by the upward projection 57 from the end wall 5 of housing 2 and downward projection 58 from upper end bell 30. Between the rotor assembly 39 and the upward and downward projections 57 and 58 are thrust washers 59, or the projections themselves may be hardened for supporting the weight of the rotor assembly 39 and pump impeller 45.

Where an explosion proof construction is required, the lower end bell 29 has a tight running clearance with the adjacent surface of the rotor assembly 39 to provide a flame barrier for the motor, with bleed openings 60 in the lower end bell 29 which are sufficiently small to act as a flame barrier and yet allow circulation of a portion of the pumped fluid through the stator bore 37 and return between the fastener 35 and rotor assembly 39 for cooling the motor and providing lubrication for the rotating parts. Larger openings or windows 61 in the upper flange portion 15' of vapor housing 16 allow the vapors from hot fluids to be returned to the tank and separated from the fluid so that the impeller does not vapor lock. The slight clearance 62 between the transverse web portion 34 of vapor housing 16 and rotor end ring 44 is sufficient to permit passage of vapor and a portion of the pumped fluid therethrough, but most of the pumped fluid is discharged through the discharge passage 23 as aforesaid. A bleed hole 63 may also be provided in the upper end bell 30 to prevent vapors from being trapped within the upper end of the motor and also provide increased circulation, but the hole must be sufficiently small to be a flame barrier.

In summary, the motor driven pump of this invention utilizes a single fastener for securing the pump and motor together, which fastener also provides a bearing support for the rotor and may be made hollow to provide an exit for the electrical lead wires for the motor, and then filled with a sealant. Such a pump and motor combination is very simple in construction and is highly reliable, since there are relatively few parts and substantially only one moving part. Moreover, because the usual bearings for the rotor and impeller shafts are not required, and there is no need to shim for impeller clearance, the cost of the assembly is quite low and the assembly is also lightweight and very compact, thus making it particularly suitable for use on light aircraft, as a fuel boost pump or other type pump. This type of construction also provides for perfect, accurate alignment of the rotor and impeller bearings because of the utilization of one common support.

I, therefore, particularly point out and distinctly claim as my invention:

1. A motor driven pump comprising a pump housing containing a pumping chamber and a pump impeller mounted for rotation in said pumping chamber; a motor comprising a stator assembly having a stator bore, and a rotor assembly concentrically disposed in said stator bore; an elongated fastener extending through said motor and pump housing for securing said motor and pump housing together, said elongated fastener being in coaxial alignment with said stator bore and having an outer cylindrical surface providing a common bearing mount for said rotor assembly and pump impeller, and a vapor housing between said motor and pump housing, said motor having an end bell at one end with a shoulder which engages said vapor housing upon tightening of said fastener for locating said motor with respect to said vapor housing and said vapor housing with respect to said pump housing.

2. The motor driven pump of claim 1 wherein said end bell has a bleed opening therethrough communicating with said pumping chamber for permitting circulation of a portion of the pump fluid through said rotor assembly.

3. The motor driven pump of claim 1 further comprising an insert disposed within said pump housing which is closely slidably received in both said pump housing and vapor housing for accurately locating said housings with respect to each other.

4. The motor driven pump of claim 3 wherein said insert has a transverse web intermediate its ends which divides the space enclosed by said pump housing into said pumping chamber and an inlet chamber, said transverse web having an opening therethrough providing fluid communication between said inlet chamber and pumping chamber, and inlet and exit ports through said pump housing communicating with said inlet chamber and pumping chamber, respectively.

5. The motor driven pump of claim 1 wherein said fastener is hollow to provide an exit for electrical lead wires for supplying power to said motor, said hollow fastener being sealed with a sealant.

6. A motor driven pump comprising a pump housing containing a pumping chamber and a pump impeller mounted for rotation in said pumping chamber; a motor comprising a stator assembly having a stator bore, and a rotor assembly concentrically disposed in said stator bore; an elongated fastener extending through said motor and pump housing for securing said motor and pump housing together, said elongated fastener being in coaxial alignment with said stator bore and having an outer cylindrical surface providing a common bearing mount for said rotor assembly and pump impeller; and an inverter assembly adjacent the end of said motor furthest from said pump housing, said inverter assembly being secured to said motor, said fastener being hollow and sealed to provide an exit for electrical lead wires for supplying power to said inverter assembly.

7. The motor driven pump of claim 6 wherein said inverter assembly has a housing with a skirt portion which fits over the end of said motor for proper location of said inverter assembly thereon.

8. The motor driven pump of claim 6 wherein said elongated fastener constitutes the sole means by which said motor and pump are secured together.

9. A motor driven pump comprising a pump housing containing a pumping chamber and a pump impeller mounted for rotation in said pumping chamber; a motor comprising a stator assembly having a stator bore, and a rotor assembly concentrically disposed in said stator bore, said motor having an annular housing extending therefrom for engagement with said pump housing; an insert disposed within said pump housing which is closely slidably received in both said pump housing and annular housing for accurately locating said housings with respect to each other; and means for securing said motor and pump housing together.

10. The motor driven pump of claim 9 wherein said means for securing said motor and pump housing together comprises an elongated fastener extending through said motor and pump housing, said elongated fastener constituting the sole means by which said motor and pump are secured together.

11. The motor driven pump of claim 9 wherein said means for securing said motor and pump housing together comprises an elongated fastener extending through said motor and pump housing, said fastener being hollow to provide an exit for electrical lead wires for supplying power to said motor, said hollow fastener being sealed with a sealant.

12. The motor driven pump of claim 9 wherein said means for securing said motor and pump housing together comprises an elongated fastener extending through said motor and pump housing, said rotor assembly and impeller including bearings telescopically received on said fastener, said impeller being part of said rotor assembly for rotation thereby.

13. The motor driven pump of claim 9 wherein said impeller has a closed shroud and said motor and pump have support surfaces for locating said pump impeller in said pumping chamber and said rotor assembly in said stator bore.

14. The motor driven pump of claim 9 wherein said insert has a transverse web intermediate its ends which divides the space enclosed by said pump housing into said pumping chamber and an inlet chamber, said transverse web having an opening therethrough providing fluid communication between said inlet chamber and pumping chamber, and said pump housing has inlet and exit ports communicating with said inlet chamber and pumping chamber, respectively.